(12) United States Patent
Camarena-Vazquez

(10) Patent No.: US 11,427,047 B2
(45) Date of Patent: Aug. 30, 2022

(54) MULTIPURPOSE WATERCRAFT

(71) Applicants: Guillermo Camarena-Vazquez, Sydney (AU); Susanne Holmes, Sydney (AU)

(72) Inventor: Guillermo Camarena-Vazquez, Sydney (AU)

(*) Notice: Subject to any disclaimer, the term of this patent is extended or adjusted under 35 U.S.C. 154(b) by 36 days.

(21) Appl. No.: 17/050,007

(22) PCT Filed: Jun. 17, 2019

(86) PCT No.: PCT/AU2019/050619
§ 371 (c)(1),
(2) Date: Oct. 23, 2020

(87) PCT Pub. No.: WO2020/000023
PCT Pub. Date: Jan. 2, 2020

(65) Prior Publication Data
US 2021/0031578 A1    Feb. 4, 2021

(30) Foreign Application Priority Data

Jun. 25, 2018   (AU) .............................. 2018902265

(51) Int. Cl.
*B60F 3/00* (2006.01)
*B63B 34/54* (2020.01)
(Continued)

(52) U.S. Cl.
CPC ............ *B60F 3/003* (2013.01); *B60F 3/0069* (2013.01); *B63B 34/54* (2020.02); *B63B 34/63* (2020.02);
(Continued)

(58) Field of Classification Search
CPC ......... B63B 34/54; B63B 34/63; B63B 34/67; B63B 35/607; B63B 2007/003;
(Continued)

(56) References Cited

U.S. PATENT DOCUMENTS 4,311,108 A * 1/1982 Horton ................... B63B 34/10
                                                      114/61.24
4,480,568 A  11/1984 Trefethern et al.
(Continued)

FOREIGN PATENT DOCUMENTS

GB       2303103 B    8/1997
JP    2018062279 A    4/2018

OTHER PUBLICATIONS

International Search Report for PCT/AU2019/050619 dated Jul. 24, 2019 in English (4 pages).
(Continued)

*Primary Examiner* — Daniel V Venne
(74) *Attorney, Agent, or Firm* — Fitch, Even, Tabin & Flannery, LLP

(57) ABSTRACT

A multipurpose watercraft has a pair of catamaran pontoons supported by way of a transverse control bar at forward regions thereof. The watercraft may have an arched equipment rack framework extending above rearward regions of the pontoons. The watercraft also has a pair of electric motor thrusters located respectively beneath each pontoon and the control bar comprises a pair of controls operable by hand, each control operable to control a respective thruster forwards or backwards. Alternatively, the thrusters may be remotely controlled. This configuration allows an operator to be pulled behind the control bar horizontally between the pontoons, snorkellers to be pulled behind the watercraft for recreational sightseeing and/or for remote-control rescue operations.

20 Claims, 11 Drawing Sheets

(51) Int. Cl.
  *B63B 34/67*  (2020.01)
  *B63B 34/63*  (2020.01)
  *B63B 35/607*  (2006.01)
  *B63C 9/04*  (2006.01)
  *B63C 11/46*  (2006.01)
  *B63B 7/00*  (2020.01)
  *B63H 25/02*  (2006.01)

(52) U.S. Cl.
  CPC ............ *B63B 34/67* (2020.02); *B63B 35/607* (2013.01); *B63C 9/04* (2013.01); *B63C 11/46* (2013.01); *B63B 2007/003* (2013.01); *B63H 2025/028* (2013.01)

(58) Field of Classification Search
  CPC ... B63B 35/34; B63B 34/00; B63H 2025/028; B63C 9/04; B63C 11/46; B60F 3/003; B60F 3/0069
  USPC .................. 114/343, 55.54, 283; 440/1, 6
  See application file for complete search history.

(56) References Cited

U.S. PATENT DOCUMENTS 4,700,648 A * 10/1987 Trefethern .............. B63B 34/50
  114/61.24
5,291,846 A    3/1994 Davis, Jr.

OTHER PUBLICATIONS

Written Opinion of the ISA for PCT/AU2019/050619 dated Jul. 24, 2019 in English (3 pages).
International-type search for AU Patent Application No. 2018902265 dated Jan. 15, 2019 in English (9 pages).

* cited by examiner

MULTIPURPOSE WATERCRAFT

CROSS-REFERENCE TO RELATED APPLICATIONS

This application is a U.S. national phase application filed under 35 U.S.C. § 371 of International Application No. PCT/AU2019/050619, filed 17 Jun. 2019, designating the United States, which claims priority from Australian Patent Application No. 2018902265, filed 25 Jun. 2018, which are hereby incorporated herein by reference in their entirety for all purposes.

FIELD OF THE INVENTION

This invention relates generally to a multipurpose watercraft configurable in various modes of operation including recreational sightseeing and rescue operational modes of operation.

BACKGROUND OF THE INVENTION

Recreational snorkelling is a common recreational pastime. However, a number of fatalities occur every year wherein inexperienced snorkelers are swept away in rips or overexert themselves.

Guides may help but the guides themselves are often fatigued from holding and pulling tourists, especially in strong currents or over large distances.

Furthermore, snorkelers may be stranded on shallow reefs which are inaccessible from conventional watercraft for rescue.

JP 2018062279 A (KOUCHI MARUTAKA KK) 19 Apr. 2018 [hereinafter referred to as D1] discloses a remote control catamaran type rescue boat which has a raising net arranged between the holes which can be raised to scoop a stranded person from water.

The present invention seeks to provide a way to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a multipurpose watercraft comprising a pair of catamaran pontoons supported by way of a transverse control bar at forward regions thereof. The watercraft may comprise an arched equipment rack framework extending above rearward regions of the pontoons. The watercraft further comprises a pair of electric motor thrusters located respectively beneath each pontoon. The control bar comprises a pair of user controls operably by hand, each user control operable to control a respective thruster forwards or backwards. The electric motors may be controlled from the control bar and/or remote control device.

This particular configuration allows an operator to be pulled behind the control bar horizontally between the pontoons whilst manoeuvring the watercraft using the user controls to control the thrusters. The rearward equipment rack may be arched above the pontoons so as to allow space for the operator when being pulled behind the control bar as is substantially shown in FIG. 2. Furthermore, the equipment rack may support various life-saving equipment such as rescue boards, life-saving rings, survival kits, emergency lighting and the like.

As such, in one mode of operation, the watercraft may be used for recreational sightseeing wherein a plurality of snorkelers hold onto handles and are pulled by the watercraft whilst the operator controls the control bar.

In embodiments, extension bars may extend laterally from the pontoons such that outer snorkellers are pulled by the bars and inner snorkellers are pulled by the pontoons. In this way, up to four snorkelers may be pulled behind the watercraft guided by the operator as is substantially shown in FIG. 6.

The watercraft may further be used for rescue operations including in remote control mode wherein the thrusters of the watercraft are remotely controllable from a remote controller. In embodiments, the thrusters may be controlled from control cables from the control bar and RF receiver electromechanical actuators so as to allow for dual control modes of the watercraft.

With reference to FIG. 3, the remotely controlled watercraft may comprise a rearward extension towbar which may support a life-saving ring from a tow rope. In this way, the watercraft may be remotely controlled by the controller to reverse to a person stranded on a reef or a person in distress to locate the life-saving ring close by. Once the life-saving ring is gripped by the person in distress, the watercraft may be controlled to pull the person from danger.

According to one aspect, there is provided a watercraft comprising a pair of catamaran pontoons supported by way of transverse control bar at forward regions thereof and an arched equipment rack framework spanning between rearward regions of the pontoons and a pair of electric motor thrusters located respectively beneath the pontoons and controllable from the control bar wherein the control bar comprises a pair of user controls operable by hand, each control operable to control a respective thruster forwards or backwards, such that, in use, an operator can be pulled behind the control bar between the pontoons whilst manoeuvring the watercraft using the user controls to control the thrusters.

The watercraft may further comprise side transportation wheels attached to a framework underneath each pontoon.

The side transportation wheels may be removable.

The watercraft may further comprise a forward transportation wheel.

The watercraft may further comprise a forward towbar.

The watercraft may further comprise a pull handle attached to a distal end of the towbar.

The pull handle may be vertically adjustable with respect to the pull handle.

The watercraft may further comprise a rescue board attached to the arched equipment rack framework.

The arched equipment rack framework may comprise a horizontal cross bar and wherein the rescue board may be located under the crossbar.

The watercraft may further comprise at least one of strobe and/or emergency lighting located atop the crossbar.

The watercraft may further comprise snorkeller extension bars extending laterally from the pontoons.

The watercraft may further comprise tow handles attached to distal ends of the snorkeller extension bars.

The snorkeller extension bars may attach through transverse sleeves extending through the pontoons.

The extension bars and the corresponding sleeves may have a rectangular cross-section.

The snorkeller extension bars may be removal from the sleeves.

The snorkeller extension bars may be slidably retained within the sleeves so as to be lateral offset adjustable.

The watercraft may further comprise further tow handles attached to the pontoons.

The watercraft further may comprise a receiver operably coupled to the thrusters and further comprising a remote controller for controlling the thrusters via the receiver.

The receiver may be operably coupled to electromechanical actuators coupled to mechanical controls for the thrusters.

The mechanical controls may be further controlled from cables operably coupled to control levers attached to the control bar.

The watercraft may further comprise a rearward tow pole.

The rearward tow pole may support a pulley at a distal end thereof through which a tow rope may be slidably retained.

The rearward tow pole bar may be length adjustable.

The rearward tow pole may comprise telescopic members.

According to a further aspect, there is provided a method for towed guided sightseeing using the watercraft, the method comprising towing snorkelers being the watercraft, the watercraft being operated by an operator located between the pontoons to control the thrusters using the pair of controls.

According to a further aspect, there is provided a method for towed guided sightseeing using a watercraft, the method comprising towing snorkelers from the snorkeller extension bars, the watercraft being operated by an operator located between the pontoons to control the thrusters using the pair of controls.

According to a further aspect, there is provided a method for rescue operations using a watercraft the method comprising attaching a flotation device to a tow rope operably retained by the tow pole and controlling the thrusters of the watercraft using a remote controller to reverse the watercraft towards a person requiring rescue so as to position the flotation device nearby wherein, once the flotation device is held by the person, further controlling the thrusters of the watercraft using the remote controller to drive the watercraft forwards.

Other aspects of the invention are also disclosed.

BRIEF DESCRIPTION OF THE DRAWINGS

Notwithstanding any other forms which may fall within the scope of the present invention, preferred embodiments of the disclosure wheel now be described, by way of example only, with reference to the accompanying drawings in which.

DESCRIPTION OF EMBODIMENTS

Figure 1:
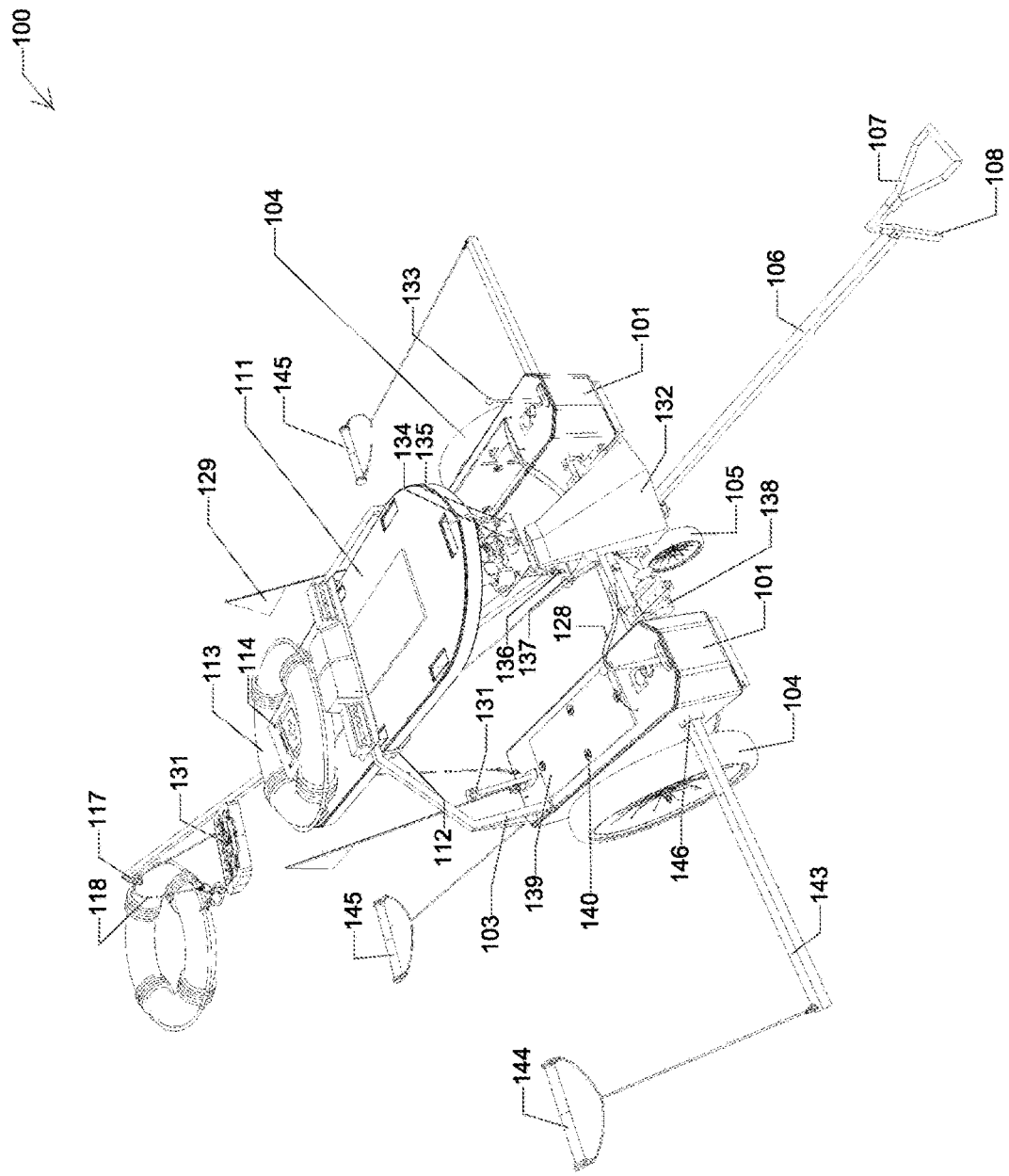
FIG. 1 shows a top perspective view of a watercraft in accordance with an embodiment.

FIG. 1 shows a watercraft 100 configurable in the various modes of operation as is substantially shown in FIGS. 2-7.

The watercraft 100 comprises a pair of catamaran pontoons 101 spaced apart from a front region thereof by transverse control bar 102. The pontoons 101 may be supported at a rear end thereof by way of an equipment rack framework 103 arched between the rear of the pontoons 101. In this way, an operator may swim between the pontoons 101 operating the control bar 102 in the manner substantially illustrated in FIG. 2.

Figure 7:
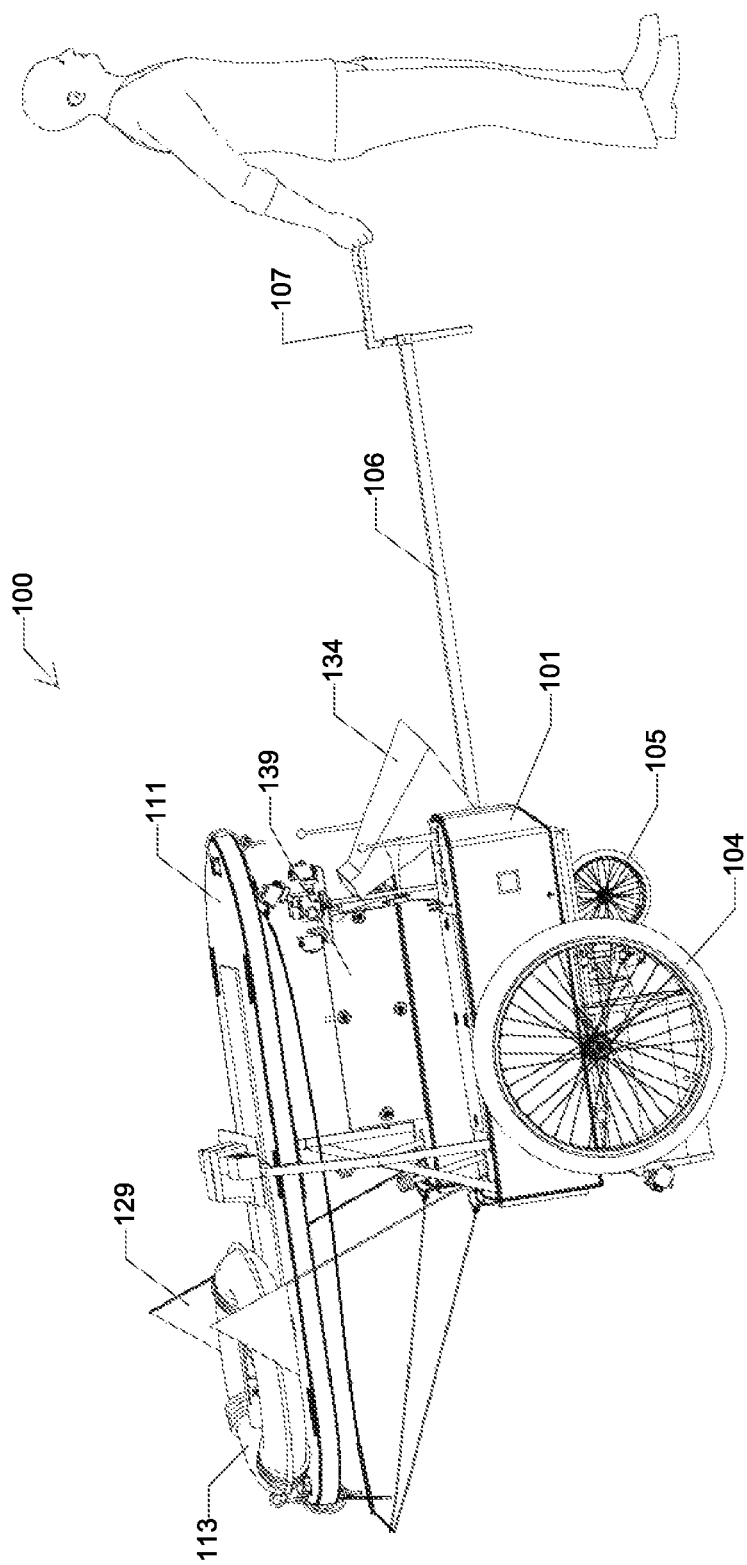
FIG. 7 illustrates the transportation on land of the watercraft using transportation wheels and a towbar in accordance with an embodiment.

The watercraft 100 may comprise quick release transportation wheels 104 coupled to an underside framework of each pontoon 101. Furthermore, the watercraft 100 may comprise a forward diminutive transportation wheel 105. The wheels 104, 105 allow the watercraft 100 to be moved on land, including by being pulled by towbar 106 and adjustable pull handle 107. The adjustable pull handle 107 may slide within an engagement sleeve 108 to adjust the elevation thereof with respect to the towbar 106. FIG. 7 illustrates the watercraft 100 being pulled by towbar 106 and pull handle 107.

The equipment rack framework 103 may support emergency strobe lights and/or spotlights 110. The equipment rack framework 103 may support a rescue board 111 by underside attachments 112 above the pontoons 101.

In embodiments, the rescue board 111 may be rearwardly poised within the underside attachments 112 and retained therein by way of locking pin(s) controlled by actuators to release the locking pins. In this way, the during deployment, the locking pins may be retracted such that the rescue board 111 is substantially autonomously deployed from the rear of the watercraft 100.

A life-saving ring 113 may locate atop a rear of the rescue board 111.

Furthermore, a survival kit 114 may locate within the life-saving ring 113. The rescue board 111 and/or the life-saving ring 113 may be detached when required for rescue operations.

Figure 3:
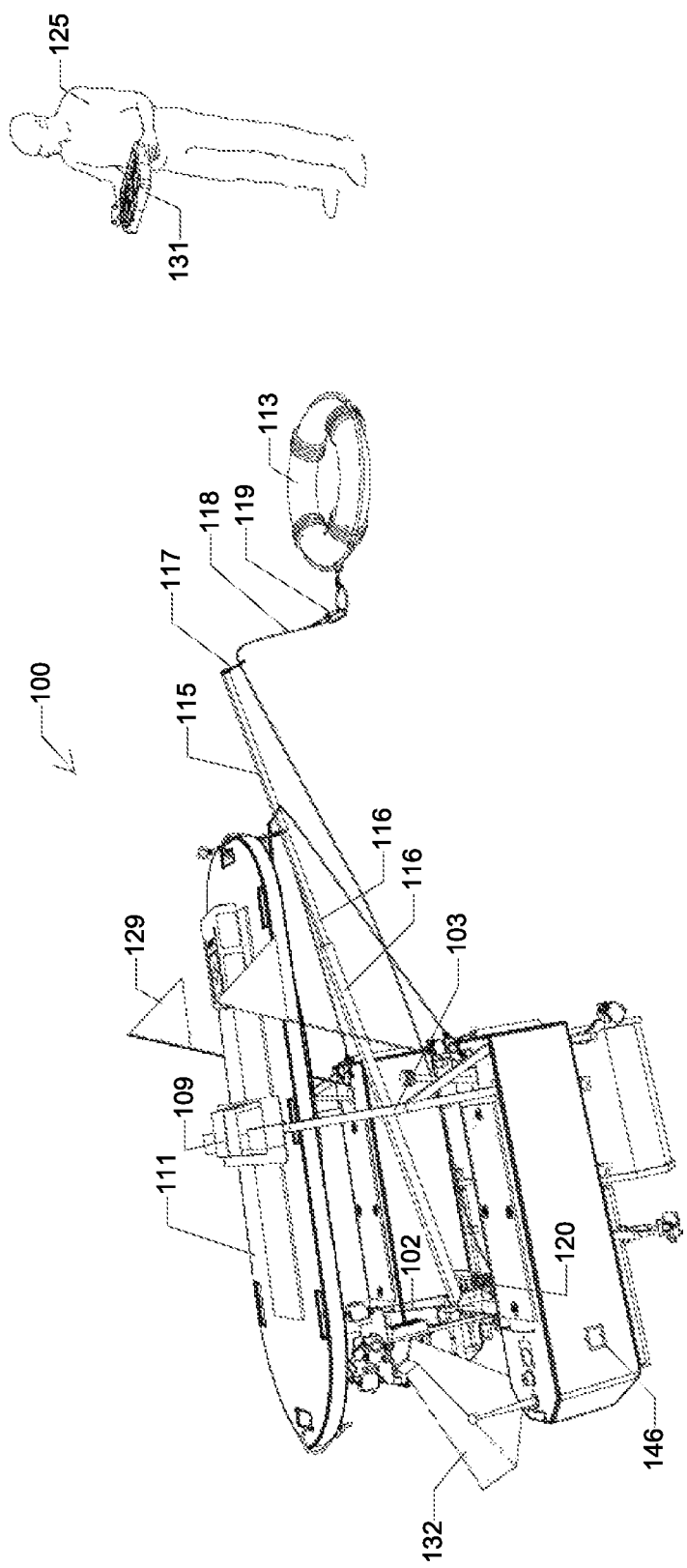
FIG. 3 illustrates an embodiment wherein the watercraft is usable in a remote-control mode of operation to guide a life safety device from a rearward extension pole and tow rope in accordance with an embodiment.

FIG. 3 illustrates the watercraft 100 comprising a rear extension pole 115 comprising telescopic members 116 and which may be attached at a forward end thereof to the control bar 102. The rear end of the extension pole 115 may comprise a pulley 117 through which a tow rope 118 is fed and which may attach to the life-saving ring 113 by way of carabiner 119. In this way, the life-saving ring 113 may be towed behind the watercraft 100 at various distances according to the length of the tow rope 119. The rope 118 may be coiled into a coil 120.

Figure 4:
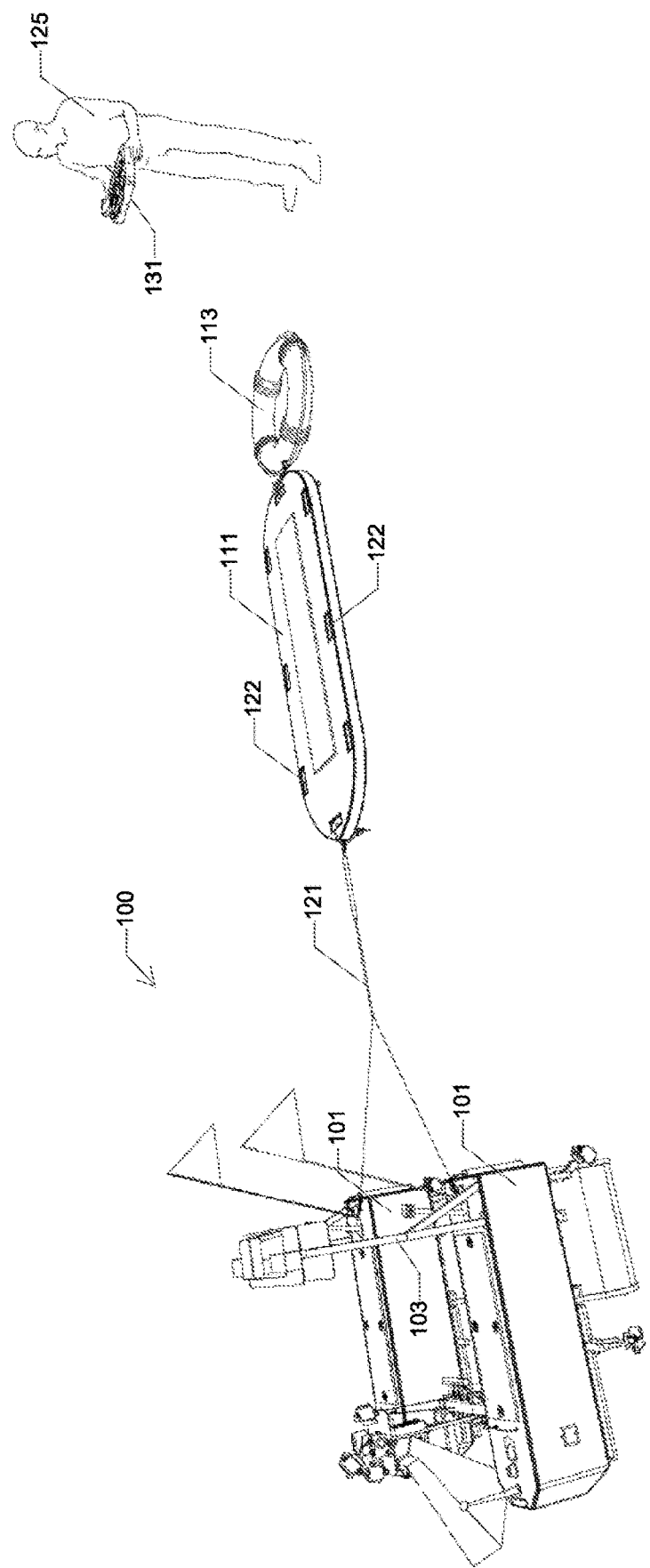
FIG. 4 illustrates an embodiment wherein the watercraft is used in a remote-control mode of operation to pull various life-saving equipment behind a tow rope attached to pontoons of the watercraft in accordance with an embodiment.

FIG. 4 illustrates the rescue board 111 having been detached from the equipment rack framework and being pulled behind the watercraft 100 by way of a tow rope 121 which attaches to the rear of the pontoons 101. The lifesaving ring 113 may be coupled to the rear of the rescue board 111. The rescue board 111 may comprise a plurality of handles 122 thereabout.

Figure 2:
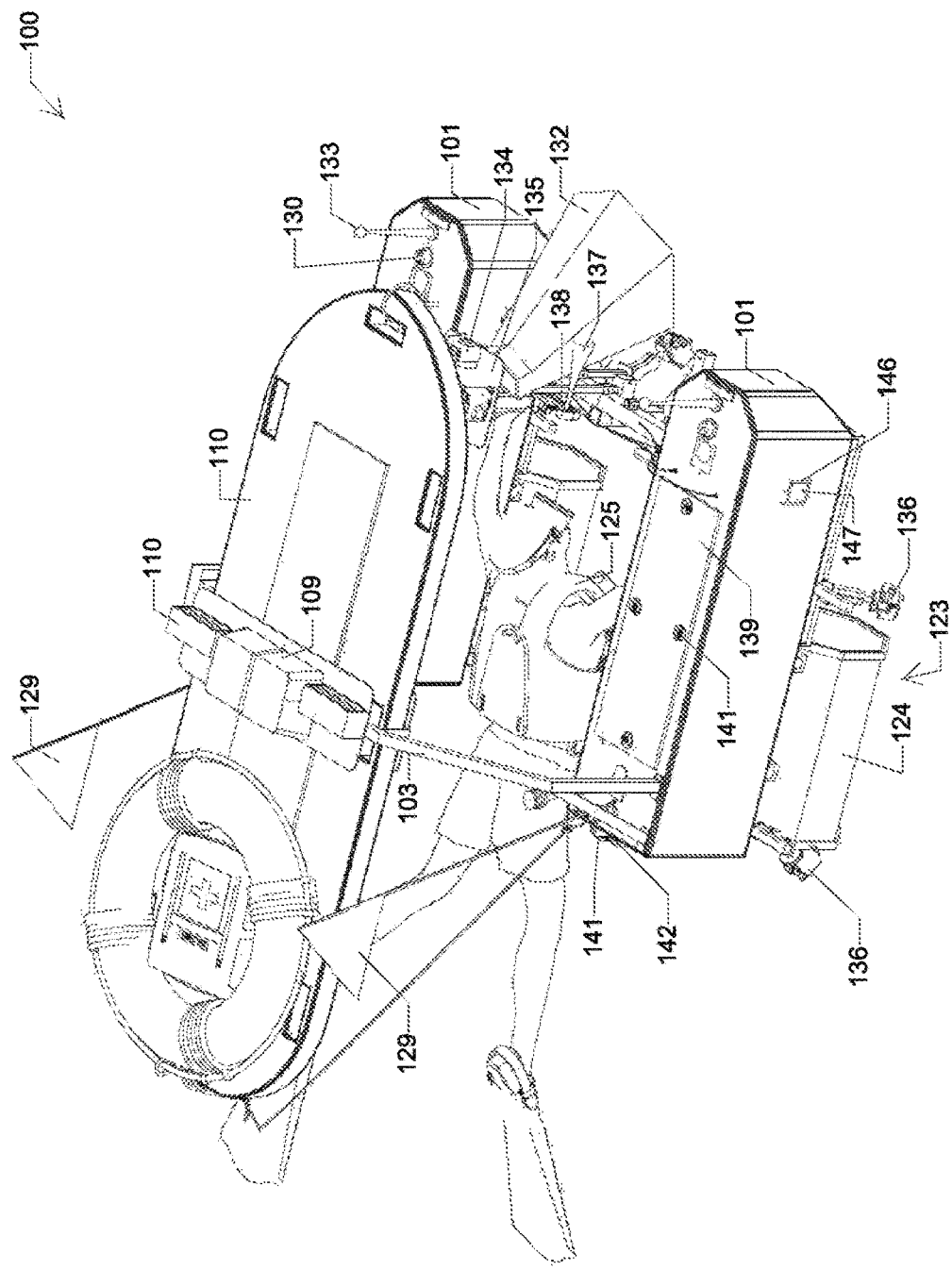
FIG. 2 illustrates the watercraft in a first mode of operation wherein an operator is pulled behind a control bar between pontoons of the watercraft.

FIG. 2 illustrates the watercraft comprising underwater electric motor thrusters 123 protected by cylindrical coverings 124. The operator 125 controls the control bar 102 to control the thrusters 123 independently to manoeuvre the watercraft 100.

Figure 6:
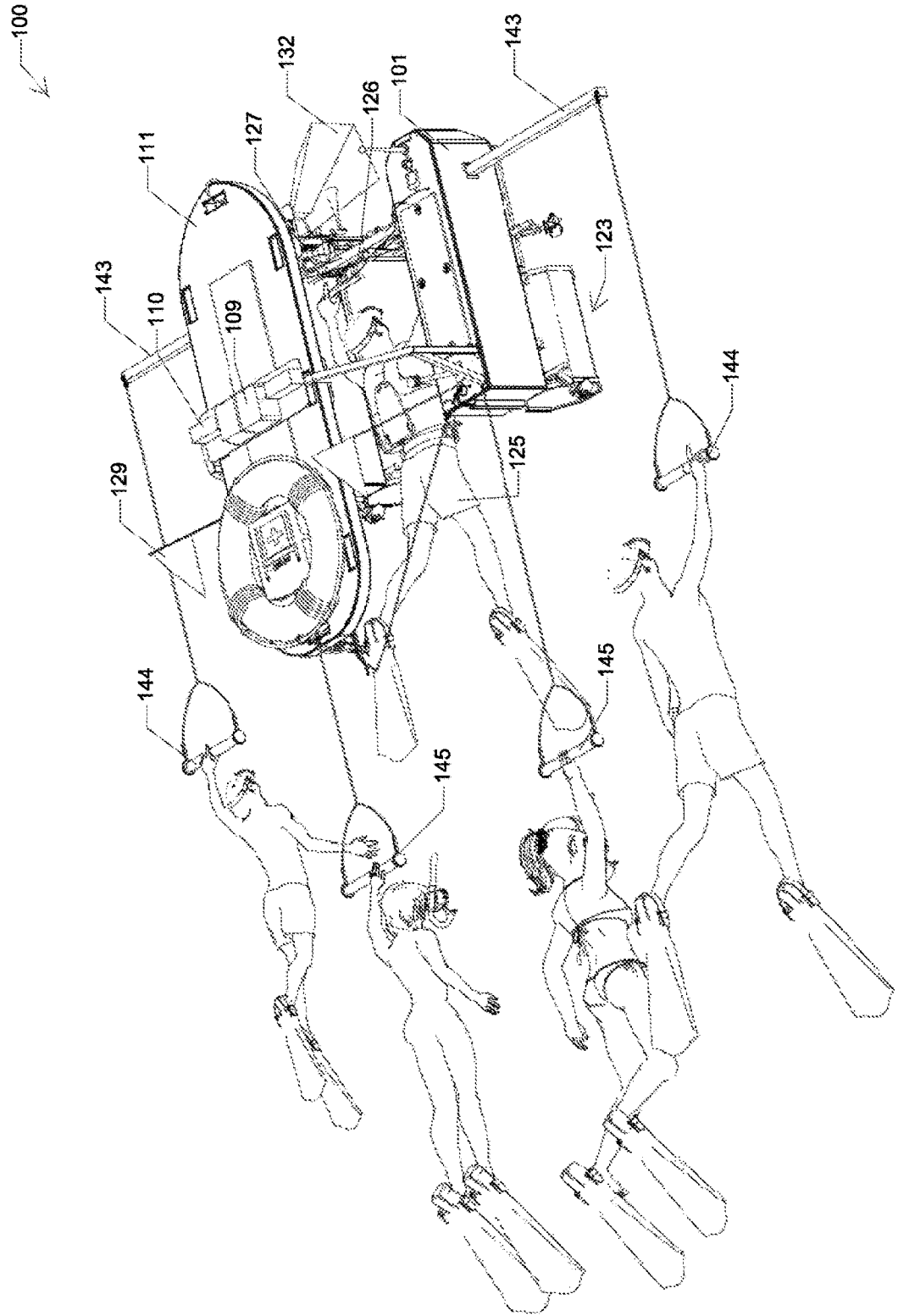
FIG. 6 illustrates a further mode of operation of the watercraft for towing up to four snorkelers being guided by an operator.

FIG. 6 illustrates the control bar 102 comprising a pair of handles 126 which are held by the operator 125. Forward of the handles 126 may be user controls operable by hand such as control levers 127 which control the operation of the thrusters 123. In the embodiment shown in FIG. 6, the levers pivot either side of a central pivot point so that the operator may pull a portion of the lever 127 to the left of the pivot point to drive a respective thruster forwards and to pull a portion of the lever 127 to the right of the pivot point to drive the respective thruster 123 in reverse.

There is shown control cables 128 leading from the control levers 127 into the pontoons 101 which mechanically engage electric switches which control the power supply to the thrusters 123. In the embodiments shown, the left-hand control lever 127 controls the right hand thruster 123 and vice versa. As such, using both hands holding onto the handles 126, the operator 125 may control the control levers 127 using forefingers to drive the watercraft 100 forwards and in reverse and to change direction.

Figure 9:
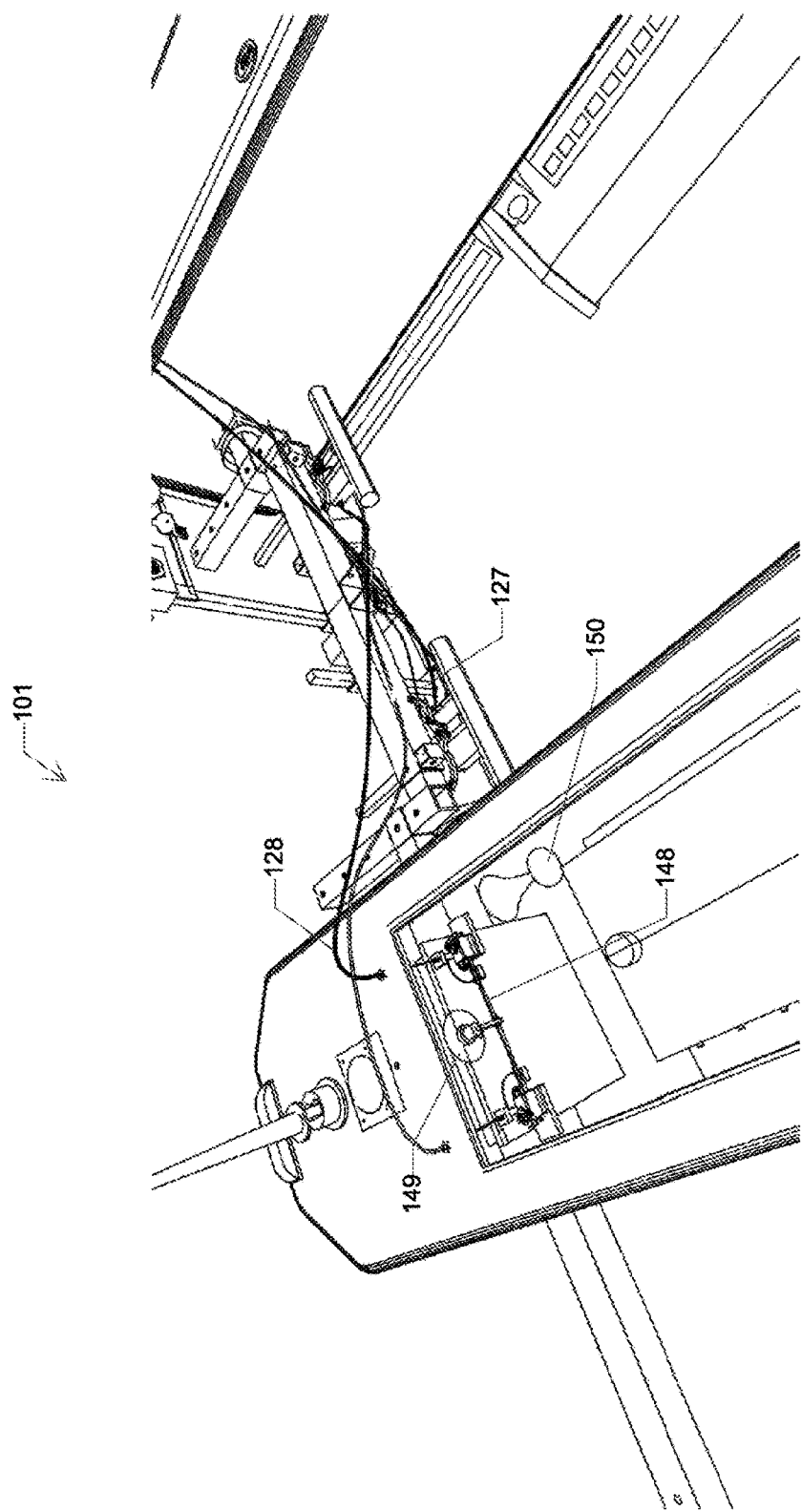
FIG. 9 illustrates an exemplary control interface of the watercraft in accordance with an embodiment.

FIG. 9 illustrates an interior of the pontoon wherein the control cables 128 pull oppositely on a rotary switch handle 148 of a 50 amp rotary switch 149 which in turn controls the thrusters 123. For remote control, actuators (such as servos) may act on the same rotary switch handle 148.

FIG. 9 further shows the installation of a marine horn 150 within the pontoon 101.

With reference to FIG. 1, the watercraft 100 may comprise rear visibility flags 129. Bow running lights 130 and stern running lights 131 may also be provided.

The watercraft 100 may be remotely controlled by RF remote controller 131. In this way, the watercraft 100 may be controlled remotely as is substantially illustrated in FIGS. 3-5.

In accordance with this embodiment, the watercraft 100 may comprise an RF receiver located within one of the pontoons 101 which receives radio signals from the remote controller 131. In embodiments, the RF receiver controls electromechanical actuators which act on the mechanical actuators controlled by the control cables 128, thereby allowing the control of the watercraft 100 by both the control levers 127 and the remote controller 113. The watercraft 100 may comprise RF antennas 133, including for receiving RF signals from the controller 131 and/or for receiving and transmitting RF communication signals. The watercraft 100 may comprise a semi submerged underwater observation hood 132 for viewing the underwater environment.

The watercraft may comprise a plurality of cameras 134 located atop central support platform 135. With reference to FIG. 2, the watercraft 100 may further comprise underwater cameras 136 supported underneath the pontoons 101.

The watercraft 100 may comprise a lifeguard whistle or an emergency horn 137 for emergency signalling. The watercraft 100 may further comprise an anchor bag and rope 138.

The interior of the pontoons 101 may be accessed via upper pontoon covers 139 held in place by lid clamps 140. 12 or 24 V electric batteries may be located within the pontoons 101. With reference to FIG. 2, electric supply cabling 141 may lead out from an upper rear surface of the pontoons 101 down rearward sleeves 142 to the thrusters 123.

The watercraft 100 may comprise snorkeller extension bars 143 which extend laterally from the pontoons 101 for supporting outer snorkel handles 144. Additional inner snorkel handles 145 may be attached to the rear of the pontoons 101, thereby allowing the sightseeing configuration substantially shown in FIG. 6 wherein the operator 125 is able to guide four snorkelers.

The extension bars 143 are preferably removable when not required. Furthermore, the lateral extent of the extension bars 143 may be adjustable. In this regard, the proximal ends of the extension bars 143 may feed through transverse sleeves 146 extending across through front regions of the respective pontoons 101. A locking pin arrangement 147 may hold the extension bars 143 in place, including at various lateral offsets.

Figure 5:
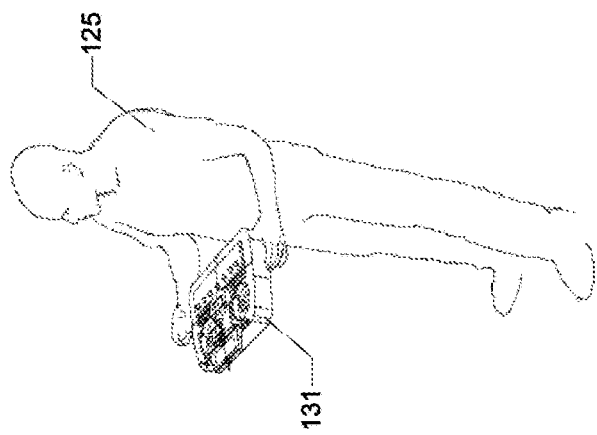
FIG. 5 illustrates the remote control of the watercraft having the various life-saving flotation equipment stowed thereatop in accordance with an embodiment.
Figure 5:
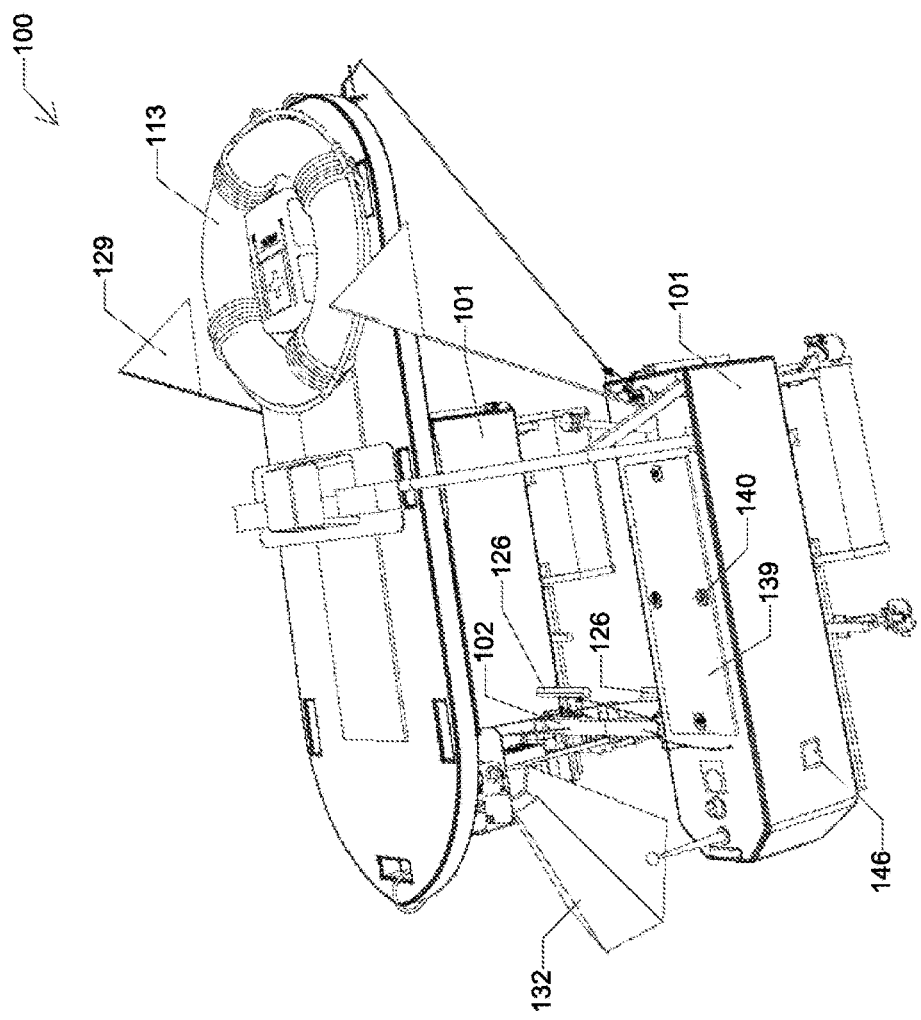

FIG. 3-5 illustrate the watercraft 100 in a remote-control mode of operation wherein a remote operator 125 controls the watercraft 100 using RF remote controller 131. In the embodiment shown in FIG. 3, the rearward extension pole 115 is engaged and supports the total tow rope 118 from the pulley 117 so as to guide and tow the life-saving ring 113. For example, should a person become stranded on a shallow reef, the watercraft 100 may be controlled using the controller 131 to reverse up to the stranded person such that the person is able to grab the life-saving ring 113. The watercraft 100 may then be driven forwardly to drag the person from the reef.

FIG. 6 illustrates a sightseeing mode of operation wherein an operator 125 controls the watercraft to tow four snorkelers using the outer and inner snorkeller handles 144, 145. The operator 125 uses the control levers 127 to control the thrusters 123 to pull the snorkelers behind the watercraft 100 by the handles 144, 145.

FIG. 7 illustrates the transportation wheels 104, 105 engaged to the watercraft 100 for towing on land by towbar 106 and adjustable pull handle 107

Figure 8:
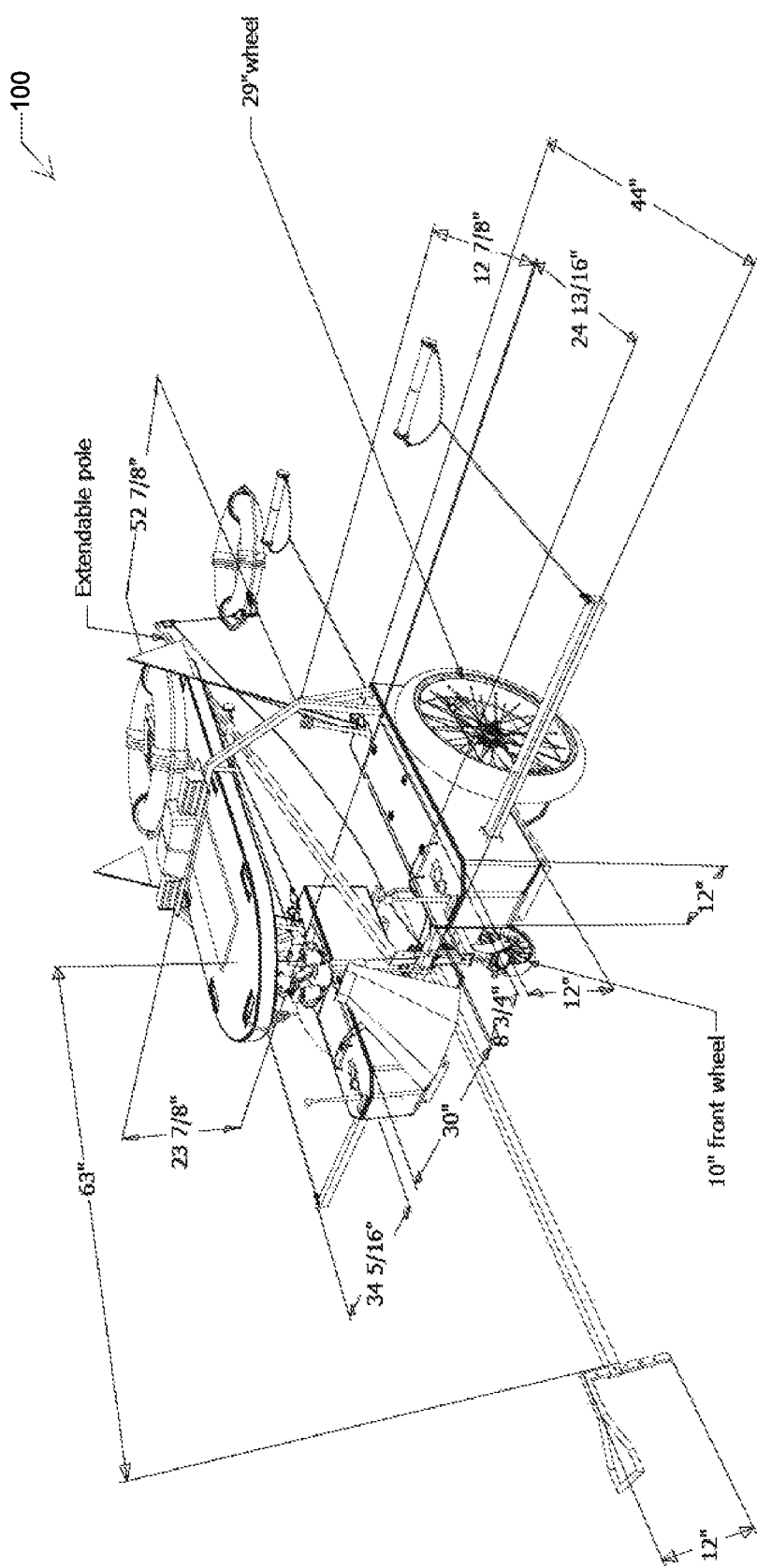
FIG. 8 illustrates exemplary dimensions of the watercraft in accordance with an embodiment.

FIG. 8 illustrates exemplary dimensions of the watercraft 100.

Figure 10:
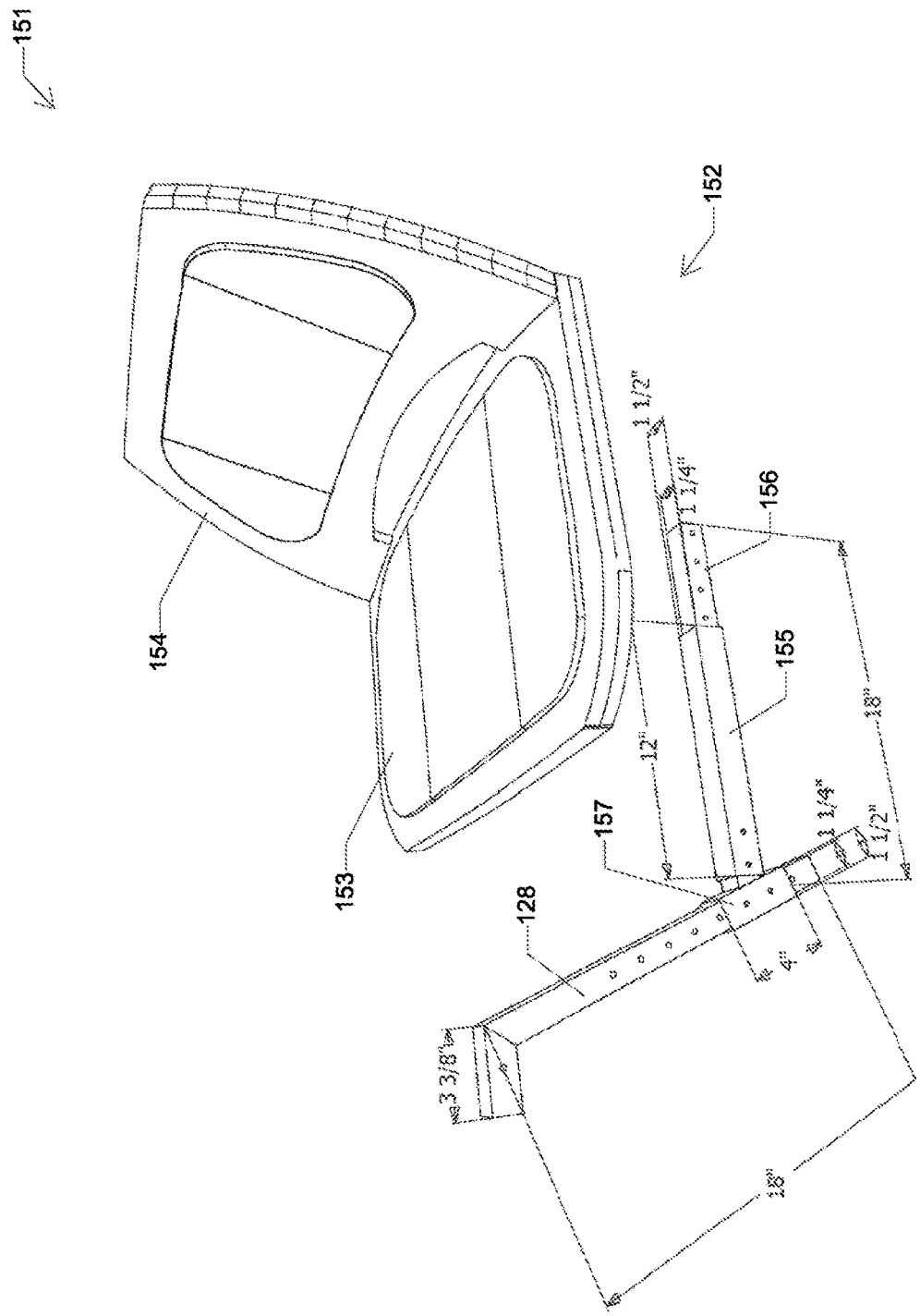
FIG. 10 illustrates an adjustable chair arrangement for the watercraft in accordance with an embodiment.

FIG. 10 illustrates an adjustable chair arrangement 151 in accordance with an embodiment. The arrangement 151 comprises a seat 152 which may comprise a seat portion 153 and a substantially orthogonal back portion 154.

The seat 152 may be coupled to a horizontally sliding sleeve 155 slidably retained along a horizontal rearward projecting bar 156. The horizontally sliding sleeve 155 may be retained at various positions along the horizontal rearward projecting bar 155 by pin aperture arrangement so as to thereby adjust the rearward position of the seat.

The front end of the horizontal rearward projecting bar 155 may itself be coupled by a substantially vertically travelling sleeve 157 itself travelling along a substantially vertical (or angled) bar 158. Similarly, the vertically travelling sleeve 157 may be retained at various positions along the substantially vertical bar 158 by way of a pin aperture arrangement so as to thereby adjust the vertical elevation of the seat 152.

Figure 11:
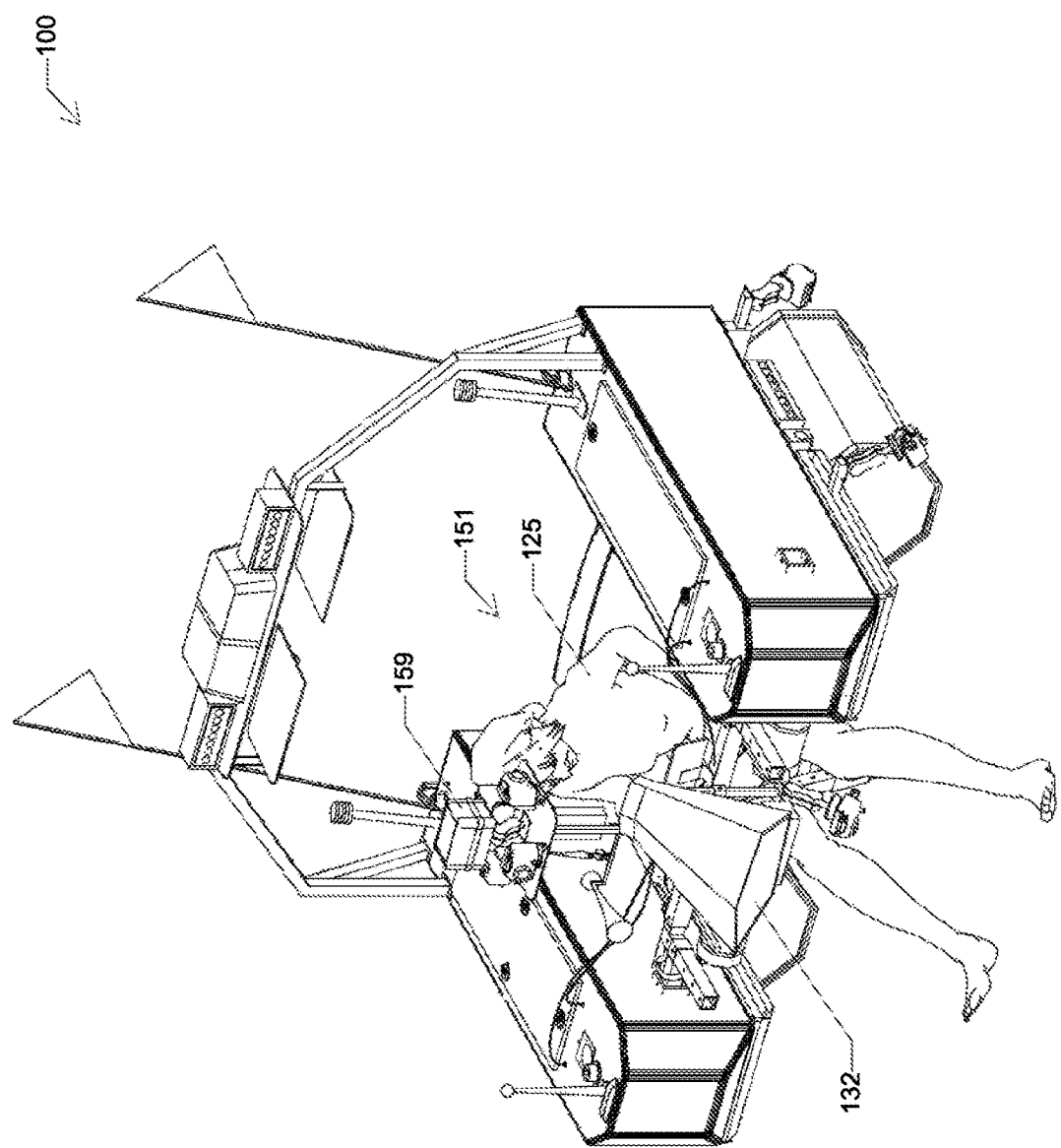
FIG. 11 illustrates an exemplary embodiment of the watercraft comprising the adjustable chair arrangement of FIG. 10 in accordance with an embodiment.

FIG. 11 shows an exemplary embodiment of the watercraft 100 comprising the adjustable chair arrangement 151 therein so as to allow the user 125 to sit substantially upright at various positions.

FIG. 11 further shows the watercraft comprising a 360° rotating Wi-Fi camera 159. In embodiments, a Wi-Fi camera may be located also within the underwater observation hood 132.

The foregoing description, for purposes of explanation, used specific nomenclature to provide a thorough understanding of the invention. However, it wheel be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A watercraft comprising:
a pair of catamaran pontoons supported by way of a transverse control bar at forward regions thereof,
an arched equipment rack framework spanning between rearward regions of the pair of catamaran pontoons, and
a pair of electric motor thrusters located respectively beneath the pair of catamaran pontoons and controllable from the transverse control bar;
wherein the transverse control bar comprises a pair of user controls operable by hand, each of the pair of user controls being operable to control a respective thruster forwards or backwards, such that, in use, an operator can be pulled behind the transverse control bar between the pair of catamaran pontoons whilst manoeuvring the watercraft using the pair of user controls.

2. The watercraft as claimed in claim 1, further comprising side transportation wheels attached to a framework underneath each pontoon.

3. The watercraft as claimed in claim 2, wherein the side transportation wheels are removable.

4. The watercraft as claimed in claim 3, further comprising a forward transportation wheel.

5. The watercraft as claimed in claim 3, further comprising a forward towbar.

6. The watercraft as claimed in claim 5, further comprising a pull handle attached to a distal end of the forward towbar.

7. The watercraft as claimed in claim 6, wherein the pull handle is vertically adjustable.

8. The watercraft as claimed in claim 1, further comprising a rescue board attached to the arched equipment rack framework.

9. The watercraft as claimed in claim 8, wherein the arched equipment rack framework comprises a horizontal cross bar and wherein the rescue board is located under the horizontal crossbar.

10. The watercraft as claimed in claim 8, further comprising at least one of a strobe and an emergency lighting located atop the horizontal crossbar.

11. The watercraft as claimed in claim 1, further comprising snorkeler extension bars extending laterally from the pair of catamaran pontoons.

12. The watercraft as claimed in claim 11, further comprising tow handles attached to distal ends of the snorkeler extension bars.

13. The watercraft as claimed in claim 11, wherein the snorkeler extension bars attach through transverse sleeves extending through the pair of catamaran pontoons.

14. The watercraft as claimed in claim 13, wherein the snorkeler extension bars and corresponding sleeves have a rectangular cross-section.

15. The watercraft as claimed in claim 13, wherein the snorkeler extension bars are removal from the corresponding sleeves.

16. The watercraft as claimed in claim 13, wherein the snorkeler extension bars are slidably retained within the corresponding sleeves so as to be lateral offset adjustable.

17. The watercraft as claimed in claim 1, wherein the watercraft further comprises a receiver operably coupled to the electric motor thrusters and further comprising a remote controller for controlling the electric motor thrusters via the receiver.

18. The watercraft as claimed in claim 17, wherein the receiver is operably coupled to electromechanical actuators coupled to mechanical controls for the electric motor thrusters.

19. The watercraft as claimed in claim 1, further comprising a rearward tow pole.

20. A method for towed guided sightseeing using a watercraft as claimed in claim 1, the method comprising towing snorkelers being the watercraft, the watercraft being operated by an operator located between the pair of catamaran pontoons to control the electric motor thrusters using the pair of user controls.

* * * * *